No. 666,691. Patented Jan. 29, 1901.
O. H. & A. F. PIEPER.
ELECTRIC MOTOR.
(Application filed Feb. 2, 1900. Renewed Dec. 18, 1900.)
(No Model.) 2 Sheets—Sheet 2.

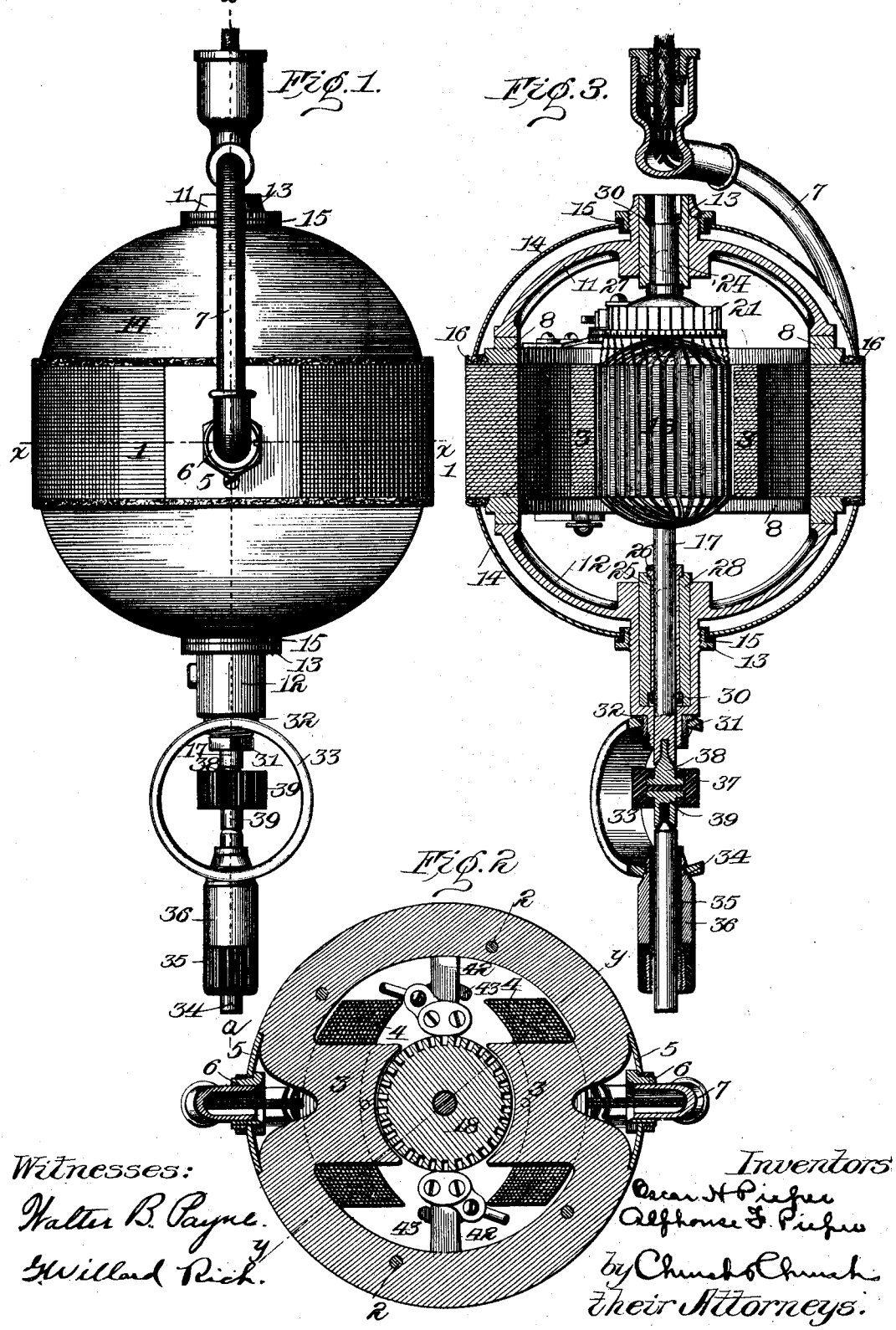

Witnesses:
Walter B. Payne.
G. Willard Rich.

Inventors
Oscar H. Pieper
Alphonse F. Pieper
by Church & Church
their Attorneys.

UNITED STATES PATENT OFFICE.

OSCAR H. PIEPER AND ALPHONSE F. PIEPER, OF ROCHESTER, NEW YORK.

ELECTRIC MOTOR.

SPECIFICATION forming part of Letters Patent No. 666,691, dated January 29, 1901.

Application filed February 2, 1900. Renewed December 18, 1900. Serial No. 40,308. (No model.)

*To all whom it may concern:*

Be it known that we, OSCAR H. PIEPER and ALPHONSE F. PIEPER, of Rochester, in the county of Monroe and State of New York, have invented certain new and useful Improvements in Electric Motors; and we do hereby declare the following to be a full, clear, and exact description of the same, reference being had to the accompanying drawings, forming a part of this specification, and to the reference-numerals marked thereon.

Our invention relates to improvements in electric motors particularly adapted for operating rotary tools, such as dental instruments, and capable of being suspended over the place of use and of a universal adjustment or movement to permit the operator to work in the most convenient manner, although the motor is capable of use for other purposes and parts thereof are applicable to other forms of apparatus; and with the object in view of facilitating the construction and operation of such motors the invention consists in certain improvements hereinafter fully described, the novel features being pointed out in the claims at the end of this specification.

Figure 4:
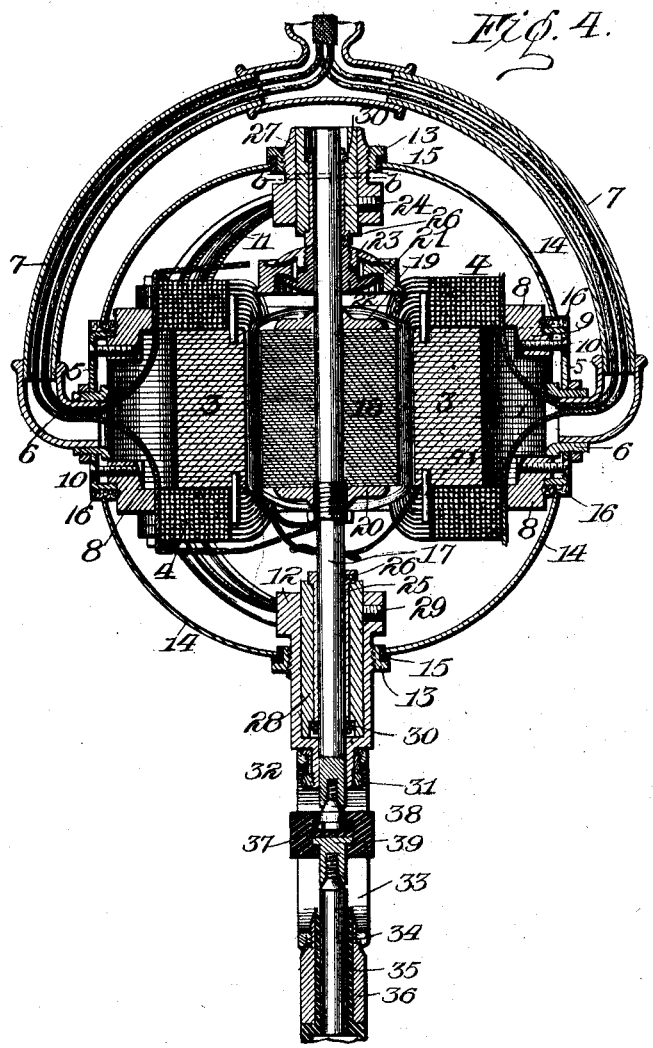
Figure 5:
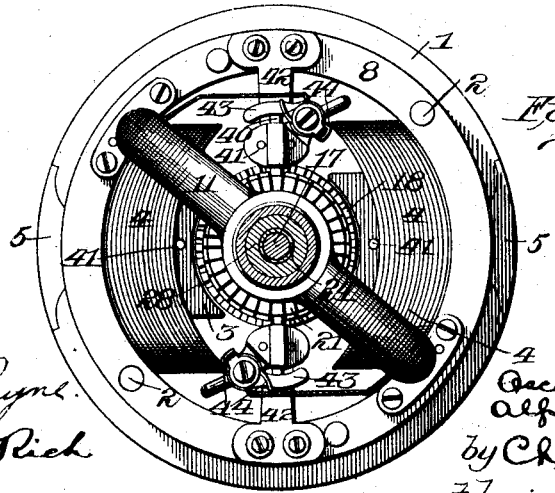

In the drawings, Figure 1 is a side elevation of a motor constructed in accordance with our invention; Fig. 2, a horizontal sectional view on the line $x\,x$ of Fig. 1; Fig. 3, a vertical sectional view on the line $y\,y$ of Fig. 2, with the field-coils removed; Fig. 4, a vertical sectional view on the line $a\,a$ of Fig. 1; Fig. 5, a horizontal sectional view on the line $b\,b$.

Similar reference-numerals in the several figures indicate similar parts.

The motor as a whole is of the general type disclosed in our prior patents, Nos. 562,742 and 619,217—that is to say, it is to be suspended from a cable containing the conductors which supply current to the motor. The main frame or body of the motor consists of the annular or ring magnet 1, composed of a number of separate flat plates of iron, preferably stamped from sheet material and firmly secured together by bolts 2 passing through them, said plates being similar in form and each having the inwardly-extending projections concaved at their proximate ends and forming when the plates are secured together the pole-pieces 3 of the motor and adapted to receive the field-coils 4, which are capable of being slipped off said ends when the armature and holding-pins 41 are removed. The outer sides of the ring magnet opposite the pole-pieces are recessed somewhat, and bridging these concavities are the plates or brackets 5, having secured therein the removable thimbles 6, which receive the inwardly-extending ends of the hollow supporting-yoke 7, upon which the motor is pivotally supported and is permitted to turn in a vertical plane. Secured to the top and bottom of the magnet, preferably by bolts connecting the parts, are the annular plates 8, having at the sides opposite the recesses in the magnet the downwardly-extending lugs 9, to which the plates 5 are secured by screws 10, as shown in Fig. 4, the upper ends of said plates 5 having flanges extending over said lug, so that the parts will be securely fastened together and an efficient support provided for the motor. Secured to the rings 8 and the bridge-pieces 11 and 12, the former above and the latter below the magnet, both of said bridge-pieces having the alined apertures or recesses for the armature-bearings, as will be described, and extended and provided on the exterior with screw-threads adapted to receive the nuts 13 for securing in place the hemispherical cover-plates 14, small felt washers 15 being located between the nuts 13 and the central apertures of said cover-plates, and felt washers 16 being arranged between the outer edges of said cover-plates and the edges of the magnet or frame and plates 5 at the sides, as shown in Figs. 3 and 4, these cover-plates effectually inclosing the operating parts of the motor and by reason of the felt or non-resonant washers described preventing the entrance of dust to the operating parts and decreasing the noise occasioned by the operation of the motor. These covers may be made of stamped or spun sheet metal, and the exterior of the magnet being covered by suitable lacquer or paint an ornamental appearance is given to the motor, and at the same time the covers being removable permit access to the operating parts for the purposes of repair or adjustment, if desired.

17 indicates the armature-shaft, having the armature-core 18 clamped upon it between the stationary collar 19 and the adjustable collar 20, screwing on the shaft, and also at the end the commutator-ring 21, secured between the clamping-collars 22 and 23, the former secured rigidly to the shaft and the latter adjustable upon it. The armature-coils are wound on the core in any suitable manner. The armature-shaft is provided near its opposite ends with bushings 24 and 25, removably secured thereon by screws 26, these sleeves having a bearing and adapted to rotate in bushings or sleeves 27 and 28, removably fastened in the tubular recesses 11 and 12 by suitable securing-screws 29 or otherwise. The sleeves 24 and 25 revolve with the armature-shaft and are preferably constructed of steel tubing, and the sleeves 27 and 28 are also removable and constructed of hard metal, so that the wearing-surfaces may be readily replaced when desired if from wear the parts should become loose. Suitable felt washers 30 are provided at the outer end of the bearings to prevent grit and other material from entering between the wearing parts. The lower end of the tubular extension of the bridge 12 is threaded for the application of a nut 31, between which and a shoulder on the extension is a collar 32, upon which a ring or yoke 33 is held and firmly clamped. This ring is for the purpose of supporting the lower shaft-section 34, to which the flexible shaft connected to the rotary tool or instrument is attached, said shaft-section 34 having a bearing in the sleeve 35, of insulating material, mounted in a collar 36, screwing into an aperture in the lower side of the ring or yoke 33. (See Figs. 3 and 4.) The coupling between the armature-shaft and the shaft-section 34 is formed by a block 37, of insulating material, in which are secured the heads of screws 38 and 39, the former screw entering an aperture in the end of the armature-shaft and the latter being preferably a female screw and receiving the threaded upper end of the shaft-section 34. The insulating material 37 effectually prevents the passage of electric currents from the armature-shaft to the tool-shaft, and the insulating-collar 35 prevents their passage from the frame of the machine to the casing of the flexible shafting, which latter may be constructed in the usual or in any preferred manner.

40 indicates the commutator-brushes, sliding in guides 41, mounted on arms 42, secured to the ring 8, said brushes being pressed toward the commutator by arms 43, operated upon by springs 44, this construction permitting the removal of the commutator-brushes and the upper bearing for the armature-shaft when the upper section of the casing is removed.

In the practical operation of the motor it is adapted to be suspended by a suitable cable, in which, as before stated, the electric conductors leading to the motor are inclosed after the manner shown in our prior patent, No. 619,217, and the flexible shaft carrying the tool is adapted to normally hang within convenient reach of the operator, and by the manipulation of the flexible shaft and tool the motor may be turned upon its pivots in the yoke 7, and the yoke and motor as a whole may be rotated in a horizontal plane by the rotation of the supporting-cable, the direction and speed of rotation being governed by a suitable controlling device exterior of the machine.

In order to facilitate the tilting or tipping of the motor, we preferably arrange the pivotal connections between it and the yoke below the center of gravity of the motor and connected parts, as shown in Figs. 1 and 4, whereby the parts arranged above the pivotal center will assist in tilting or tipping the motor on the yoke and render the manipulation by the operator easier.

By locating the inclosing shells or casing-sections 14 on opposite sides of the ring magnet, as shown, and mounting the armature-shaft in the separate bridge-pieces or frames access can readily be had to the operating parts of the motor and the commutator and connections by the removal of one casing-section only, thus simplifying the construction and improving the appearance of the device as a whole.

It is unnecessary to describe the circuit connections, as these may be the same as those contained in our prior patents and form no part of the subject-matter of this application.

We claim as our invention—

1. In an electric motor, the combination with the annular magnet, the armature, and the suspending-yoke pivotally attached to the opposite sides of the magnet, of the removable casing-sections covering the operating parts and abutting against the top and bottom of the magnet.

2. In an electric motor, the combination with the annular magnet, the armature and armature-shaft, and the suspending-yoke pivotally attached to the opposite sides of the magnet, of the bridge-pieces attached to the faces of the magnet, bearings for the armature-shaft therein, and the removable casing-sections extending over the operating parts of the motor, abutting against the top and bottom faces of the magnet and secured to the bridge-pieces.

3. In an electric motor, the combination with the annular magnet, and the suspending-yoke pivotally attached to the opposite sides thereof, of the armature and armature-shaft, the bridge attached to one face of the magnet having a bearing for the armature-shaft, and the casing-section engaging the magnet and detachably secured to the bridge.

4. In an electric motor, the combination with the annular magnet, the armature and armature-shaft, of the bridge-pieces secured to the opposite faces of the magnet, the removable bushings secured therein, and the removable sleeves secured to the shaft and rotating in the bushings in the bridge-pieces.

5. In an electric motor, the combination with the annular magnet, the armature and armature-shaft, and the yoke pivotally connected with the outer sides of the magnet, of the bridge-pieces secured to the opposite faces of the magnet, the removable bushings secured therein, and the removable sleeves secured to the shaft and rotating in the bushings in the bridge-pieces.

6. In an electric motor, the combination with the annular magnet having the recesses in its outer side, the rings attached to the faces of the magnet having the lugs extending into the recesses in the magnet, of the plates secured to the lugs on the rings, and the suspending-yoke pivotally engaging the plates.

7. In an electric motor, the combination with the annular magnet having the recesses in its outer sides, the plates covering said recesses and secured to the magnet, and the suspending-yoke pivotally connected to said plates, of the cover-plates extending over and coöperating with the top and bottom of the magnet to inclose the operating parts of the motor.

8. In an electric motor, the combination with the annular magnet having the recesses at the side, the plates covering said recesses and secured to the magnet, and the thimbles in the plates, of the hollow suspending-yoke having its ends journaled in the thimbles, the cover-plates coöperating with the faces of the magnet, and electric conductors leading into the casing through the yoke.

9. In a motor, the combination with the annular magnet, the armature and armature-shaft, of the bridge-pieces secured to the faces of the magnet having the bearings in which the armature-shaft is journaled, the threaded bosses around the bearings, the nuts on the bosses, and the cover-plates engaging the faces of the magnet and secured by the nuts.

10. In a motor, the combination with the annular magnet, the armature and armature-shaft, of a bridge-piece secured to the magnet having the bearing for the shaft, and the threaded boss around it, the nut on the boss, and the cover-plate engaging the magnet held by the nut.

11. In an electric motor, the combination with the annular magnet, the armature rotating therein, the cover or casing for the operating parts connected to the magnet, and the depending shaft exterior of the casing and connected to the end of the armature-shaft, of the suspending-yoke pivotally connected to the sides of the magnet below the horizontal center thereof, thereby permitting the easy movement of the motor on its pivots.

12. In an electric motor, the combination with the annular magnet, the armature and armature-shaft, the bridge-piece on one face of the magnet having the bearing therein for the armature-shaft having external threads, the cover engaging the magnet-face, the nut on the exterior of the bearing for securing the cover, the ring mounted on the bearing extension, the shaft supported in the ring and a coupling between said last-mentioned shaft and the armature-shaft.

13. In an electric motor, the combination with the armature and armature-shaft, of a shaft operated by the armature-shaft, and the coupling between them embodying a block of insulating material, and two screws having their heads embedded in said insulating material and engaging corresponding threads on the two shafts.

14. In an electric motor, the combination with the armature-shaft, the removable bearing-bushings secured thereto, of the bearing-supports, and the bearing-bushings removably secured in said supports, whereby either or both of said bushings may be replaced.

15. In an electric motor, the combination with the armature, the armature-shaft, the bearing-bushing removably secured thereto, of a support, a bearing-bushing removably secured therein adapted to receive the bushing on the shaft, whereby either or both of said bushings may be replaced when desired.

16. In an electric motor, the combination with the magnet, the bridge extending over the poles, and the bushing removably secured in said bridge, of the armature-shaft, the bushing removably secured to said shaft and operating in the first-mentioned bushing, whereby either or both of said bushings may be replaced in case of wear.

OSCAR H. PIEPER.
ALPHONSE F. PIEPER.

Witnesses:
G. WILLARD RICH,
F. F. CHURCH.